March 19, 1935.   R. I. BODENLOS   1,995,052
AUTOMATIC STOP VALVE
Filed July 30, 1932   2 Sheets-Sheet 1

INVENTOR:
ROBERT I. BODENLOS

Kwis Hudson & Kent
ATTORNEYS

March 19, 1935. R. I. BODENLOS 1,995,052
AUTOMATIC STOP VALVE
Filed July 30, 1932 2 Sheets-Sheet 2

INVENTOR:
ROBERT I. BODENLOS
Kwis Hudson & Kent
ATTORNEYS

UNITED STATES PATENT OFFICE 1,995,052

AUTOMATIC STOP VALVE

Robert I. Bodenlos, Cleveland, Ohio, assignor to The American Ship Building Company, Cleveland, Ohio, a corporation of New Jersey Application July 30, 1932, Serial No. 626,575

2 Claims. (Cl. 277—44)

This invention relates to control valves, and as its principal object aims to provide an improved form of automatic stop valve which may be used for controlling the supply of pressure fluid to the distributing valve of a reversible fluid pressure motor, or for various other purposes.

Another object of my invention is to provide an automatic stop valve having a valve element adapted for movement in response to actuation of a fluid distributing valve, and also having by-pass means embodied therein for reducing the pressure differential on opposite sides of the movable valve element.

It is also an object of my invention to provide an automatic stop valve, of the type referred to, wherein the by-pass means is an auxiliary valve carried by the movable valve element and arranged to be opened in advance of the latter.

A further object of the invention is to provide an automatic stop valve for controlling the supply of motive fluid to a valve chest having a distributing valve reciprocably and rotatably mounted therein, and wherein the valve element of the stop valve is actuated, upon movement of the distributing valve in either direction from a neutral position, by a cam member which is movable with the distributing valve and which has oppositely tapered annular surfaces disposed around and centered with respect to the axis of the distributing valve.

The invention may be further briefly summarized as consisting in certain novel combinations and arrangements of parts hereinafter described and particularly set out in the appended claims.

In the accompanying sheets of drawings illustrating a preferred embodiment of my invention, Fig. 1 is an outside elevational view of an automatic stop valve constructed according to my invention;

Figure 4:
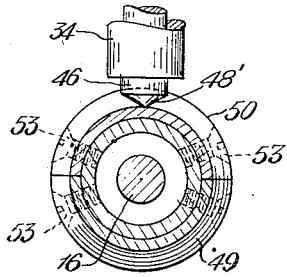
Fig. 4 is a sectional view taken on line 4—4 of Fig. 2.
Figure 3:
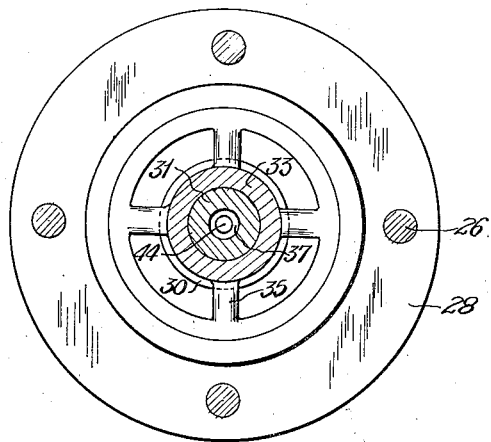
Fig. 3 is a transverse sectional view taken on line 3—3 of Fig. 2.
Figure 1:
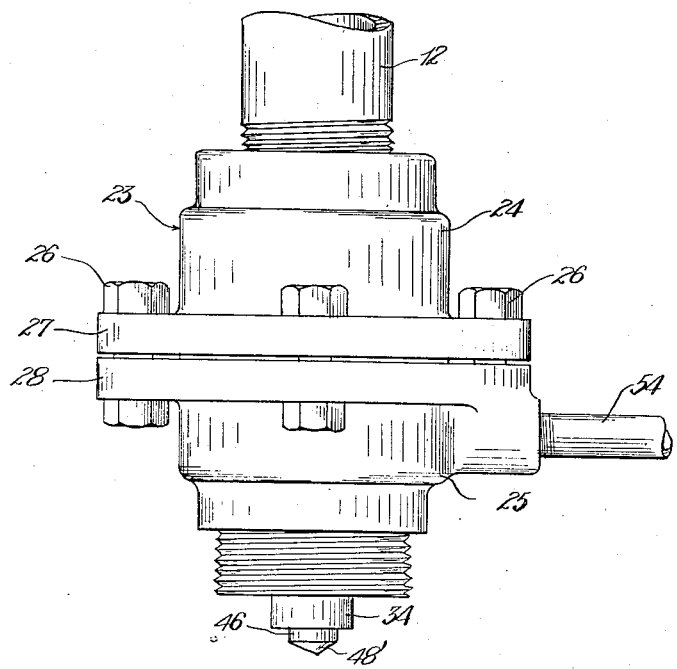

Detailed reference will now be made to the accompanying drawings wherein I have illustrated an improved automatic stop valve which may be used for controlling the supply of pressure fluid to the distributing valve of a reversible fluid pressure motor. Before proceeding with such detailed description it should be understood, however, that although my invention is herein disclosed in connection with the distributing valve of a reversible engine, my improved stop valve may be applied to other uses and may be embodied in various other apparatus.

In the drawings, I have shown my automatic stop valve applied to the distributing valve 10 of a reversible fluid pressure motor 11, which may be a reciprocating engine actuated by steam or other motive fluid, for operating the rudder of a ship or for performing other desired work. As is well understood in the engine art, considerable leakage of motive fluid may take place past such a distributing valve when the latter is in its neutral or central position, and such leakage is particularly prone to occur when the distributing valve is of the piston type. The automatic stop valve of my invention is designed for use in the motive fluid supply line, such as between the supply pipe 12 and the steam chest 13, and cooperates with the distributing valve to automatically shut off the supply of motive fluid when the distributing valve is in its neutral position and to admit motive fluid to the steam chest 13 when the distributing valve is moved in either direction from its neutral position.

Figure 2:
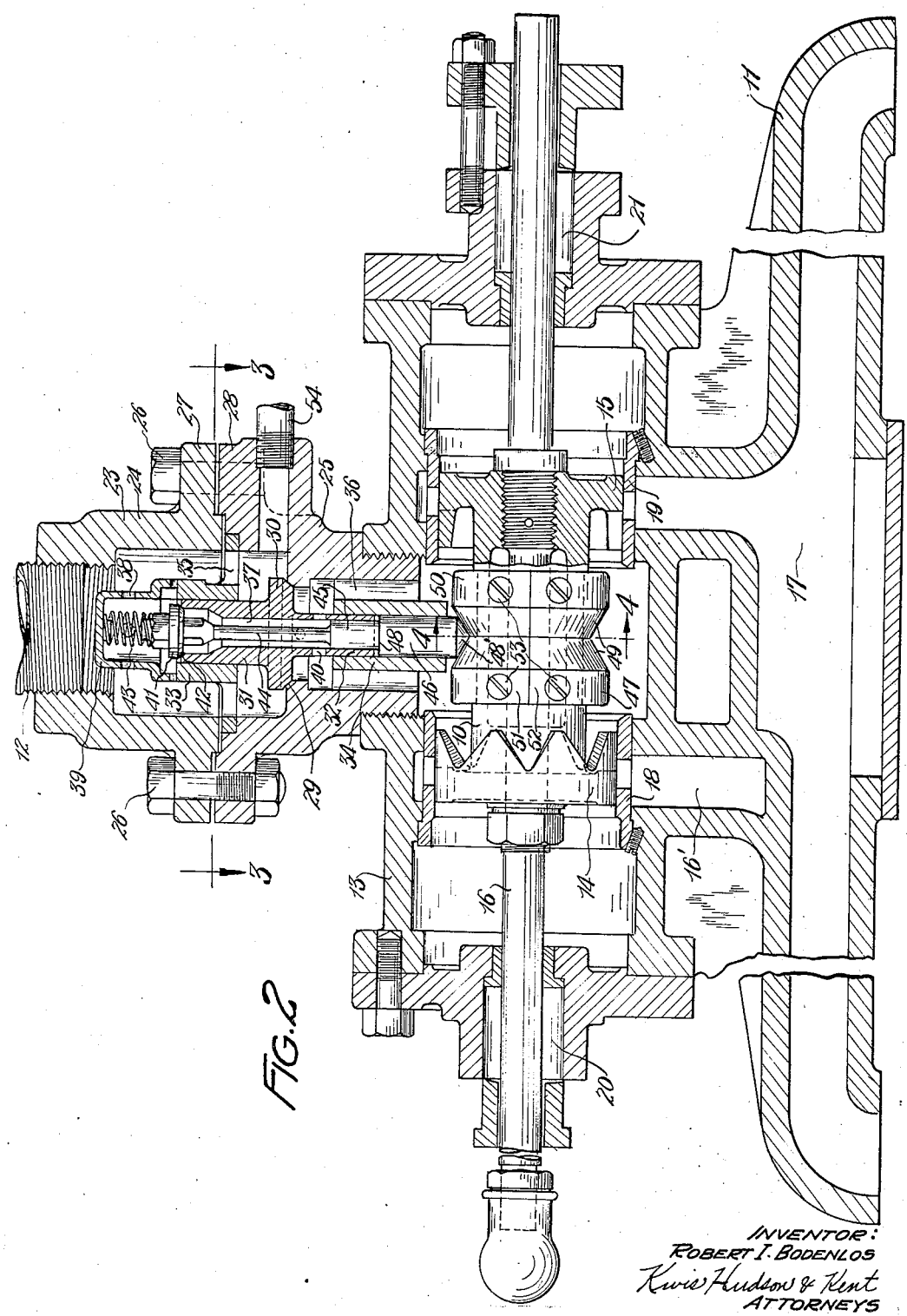
Fig. 2 is a sectional elevation thereof showing the valve arranged for cooperation with the distributing valve of a fluid pressure motor.

Although my automatic stop valve may be applied to different uses and to distributing valves of various types of construction, in this instance I have shown my stop valve designed and arranged for cooperation with a reversing valve, of the piston type, having spaced valve elements 14 and 15 mounted upon the valve stem 16 for controlling the flow of motive fluid to the different valve chests of the reversible fluid pressure motor through the passages 16' and 17. These valve elements are slidably mounted in the valve chest 13, preferably in sleeves 18 and 19 provided therein, and are actuated by the stem 16 which extends through stuffing boxes 20 and 21 provided on the end walls of the steam chest. From the arrangement as shown in Fig. 2, it will be seen that upon movement of the rod 16 to the right the valve element 15 uncovers an outlet port and permits a flow of pressure fluid into the passage 17 while the port controlled by the valve element 14 remains closed. Upon movement of the rod 16 to the left the valve element 14 uncovers the other outlet port, thereby permitting a flow of pressure fluid into the passage 16' while the port controlled by the valve element 15 remains closed.

The automatic stop valve itself is provided with a housing 23, which is preferably mounted directly upon the valve chest 13, and which may be composed of separable sections 24 and 25 secured together by a series of bolts 26 extending through the cooperating annular flanges 27 and 28. The housing is provided interiorly thereof with an annular valve seat 29 with which a reciprocable valve element 30 cooperates for controlling the passage of fluid through the housing. The movable valve element is formed with aligned stem portions 31 and 32 which project from opposite sides thereof and slidably engage in aligned guides 33 and 34. The guide 33 is of tubular form and is supported and retained in proper position by a spider 35 which is clamped between the cooperating flanges 27 and 28. The guide 34 is likewise of tubular form and is supported within the housing by a plurality of spaced integrally formed ribs 36.

As shown in Fig. 2 of the drawings, the stem portions 31 and 32 are hollow or, in other words, are provided with a passage 37 which extends through these portions and through the valve element 30. The upper end of the passage 37 communicates with the interior of the housing and with the pipe 12 through a plurality of openings 38 provided in the cup-shaped upper end 39 of the guide 33. The lower end of the passage 37 communicates, through the openings 40, with the interior of the housing at a point below the valve seat 29. As will be presently explained, this passage is provided for the purpose of admitting pressure fluid to the underside of the valve element 30 to thereby reduce the pressure differential on opposite sides of this element.

For controlling the passage 37 I provide an auxiliary valve 41, which cooperates with a valve seat 42 provided at the upper end of the stem portion 31, and which is normally pressed against this valve seat by a coil spring 43 arranged in the cup-shaped portion 39. The auxiliary valve 41 is mounted upon the upper end of an actuating stem 44 which extends downwardly through the passage 37. The portion of this stem which extends below the openings 40 is preferably provided with an enlargement or guide portion 45 which is slidable in the stem portion 32, and that portion of the stem which extends above this enlargement is of sufficiently small diameter to permit a flow of motive fluid through the passage 37.

To actuate the auxiliary valve 41 and the valve element 30 in succession, in response to movement of the distributing valve 10, I provide the lower end of the actuating stem 44 with an enlarged portion 46 which is slidable in the guide 34 and which cooperates with a cam 47 mounted on the valve rod 16. The upper end of this enlarged portion is provided with a shoulder 48, which is spaced from the lower end of the stem portion 32 when the valve element 30 is in engagement with the seat 29 and the distributing valve 10 is in its central position, to thereby form a lost motion connection between the actuating stem 44 of the auxiliary valve and the valve element 30. The lower end of the enlarged portion 46 is preferably hardened and of conical shape and constitutes a cam follower 48' which cooperates with the oppositely tapered cam surface 49.

In the operation of my automatic stop valve, motive fluid is supplied to the housing 23 by the pipe 12, and upon movement of the piston valve 10 in either direction from the neutral position illustrated in Fig. 2, the stem 44 is moved upwardly by the action of the conical cam follower 48' against one of the tapered surfaces 49. This upward movement of the stem 44 lifts the auxiliary valve 41 off its seat, against the action of the spring 43, to allow steam pressure to be delivered through the openings 38, the passage 37 and the openings 40 to the underside of the valve element 30. This by-passing of pressure fluid to the underside of the valve element reduces the pressure differential on opposite sides of this element so that a comparatively small lifting force is required to move this valve element away from its seat. After the opening of the auxiliary valve 41 by the initial upward movement of the stem 44, the shoulder 48 engages the lower end of the stem portion 32 and continued movement of the distributing valve 10 causes the valve element 30 to be lifted upwardly from its seat. When the distributing valve has been moved a sufficient distance to cause the lower end of the enlargement 46 to engage the cylindrical surface 50 of the member 47, the valve element 30 will have been opened its maximum distance and upon the return of the distributing valve to its neutral position the enlargement 46 will descend into the groove formed between the tapered cam surfaces 49 and the auxiliary valve 41 and the valve element 30 will again be seated.

It is desirable in the operation of fluid pressure motors, having distributing valves of the piston type, that these valves be rotatable as well as reciprocable in the steam chest, so as to prevent irregular wear between the cooperating surfaces. To enable my automatic stop valve to properly perform its intended function without interfering with such desired rotatable movement of the distributing valve, I make the cam surfaces 49 of annular form and center the same upon the axis of the distributing valve. To this end, I construct the actuating member 47 of semi-cylindrical sections 51 and 52 which are disposed around the body of the piston valve, intermediate the valve elements 14 and 15, and are retained in cooperating relation by suitable means, such as the screws 53. It will be seen from the arrangement shown in Fig. 2 of the drawings that the housing 23 of the stop valve is removably mounted on the valve chest 13, and that the housing and valve chest are provided with cooperating surfaces or shoulder portions which determine the extent to which the valve stem 46 extends into the chest 13 when the stop valve element 30 and the auxiliary valve 41 are in closed position.

If desired, the section 25 of the valve housing 23 may be provided with a suitable connection 54 for withdrawing steam, or for draining condensate from the valve housing and the pipe 12.

From the foregoing description and the accompanying drawings, it should now be readily understood that I have provided an efficient form of automatic stop valve, which may be conveniently applied to existing installations, and which in operation effectively prevents leakage of motive fluid past the distributing valve when the latter is in its neutral position. It will also be readily seen that in the automatic stop valve which I have provided, the by-pass is opened in advance of the movable valve element for the purpose of reducing the pressure differential between opposite sides of the latter, so that comparatively little force is required for actuating the movable valve element and an especially smooth, reliable and efficient functioning of the device is accordingly obtained.

While I have illustrated and described the device of my invention in a detailed manner, it should be understood, however, that I do not wish to be limited to the precise details of construction and arrangements of parts illustrated and described, but regard my invention as including such changes and modifications as do not involve a departure from the spirit of the invention and the scope of the appended claims.

Having thus described my invention, I claim:

1. A valve mechanism comprising a casing formed of connected sections, a valve seat in one of said sections, a hollow guide in said one section below said valve seat, a member having a hollow guide thereon, said member being adapted to be held between the sections of said casing whereby its hollow guide is positioned above the valve seat in substantial axial alignment with the first mentioned hollow guide, a main valve in said casing movably cooperating with said seat and having oppositely extending upper and lower projections, the upper of said projections being slidable in the upper guide and the lower projection being slidable in a portion of the lower guide, said main valve having a passage extending through the same and through said projections, an auxiliary valve seat on said main valve and associated with said passage, an auxiliary valve movably cooperating with said auxiliary valve seat to control said passage and having an actuating stem extending through the main valve and through said lower projection, said actuating stem having a guide portion thereon slidable in another portion of the lower guide and cooperating with said lower projection to provide a lost-motion connection between the main and auxiliary valves, and means for imparting movement to said actuating stem for operating said valves in succession.

2. A valve mechanism comprising a casing formed of connected sections, a valve seat in one of said sections, a hollow guide in said one section below said valve seat, a member having a hollow guide thereon and a cap portion disposed over the upper end of such hollow guide, said member being held between the connected sections of the casing with its hollow guide and cap portion above the valve seat and in substantial axial alignment with the lower guide, a main valve movably cooperating with said seat and having oppositely extending upper and lower projections, the upper of said projections being slidable in the upper guide and the lower projection being slidable in a portion of the lower guide, said main valve having a passage extending through the same and through said projections, an auxiliary valve seat associated with said passage and located substantially at the upper end of the upper projection, an auxiliary valve movably cooperating with said auxiliary valve seat and having an actuating stem extending through said passage, a spring in said cap portion for biasing said auxiliary valve towards said auxiliary valve seat, said actuating stem having a guide portion slidable in said lower guide below the lower projection of the main valve, cooperating shoulders on said lower projection and said guide portion providing a lost-motion connection between said actuating stem and the main valve, and cam means movable transversely of the axis of said aligned hollow guides for imparting movement to said actuating stem whereby the auxiliary and main valves are actuated in succession.

ROBERT I. BODENLOS.